United States Patent [19]
Beltrami et al.

[11] Patent Number: 5,922,220
[45] Date of Patent: Jul. 13, 1999

[54] METHOD AND APPARATUS FOR ELECTROEROSIVE CUTTING

[75] Inventors: Ivano Beltrami, Cavigliano, Switzerland; Mario Scuderi, Luino, Italy; Wolfgang Nagel, Verscio, Switzerland; Antonio Prati, *deceased, late of* Locarno, *Switzerland, by* Carmela Angelica Prati, *legal representative*

[73] Assignee: Agie SA, Losone, Switzerland

[21] Appl. No.: 08/837,314

[22] Filed: Apr. 9, 1997

[30] Foreign Application Priority Data

Apr. 10, 1996 [DE] Germany ............................ 196 14 133

[51] Int. Cl.⁶ .................................................. B23H 7/06
[52] U.S. Cl. ................................. 219/69.12; 364/474.04
[58] Field of Search ..................... 219/69.12; 364/474.04

[56] References Cited

U.S. PATENT DOCUMENTS

| | | | |
|---|---|---|---|
| 4,638,140 | 1/1987 | Obara et al. | 219/69.12 |
| 4,736,086 | 4/1988 | Obara | 219/69.12 |
| 4,801,779 | 1/1989 | Obara | 219/69.12 |
| 4,806,720 | 2/1989 | Obara | 219/69.12 |
| 5,003,147 | 3/1991 | Kawanabe et al. | 219/69.12 |
| 5,428,200 | 6/1995 | Lodetti | 219/69.12 |
| 5,440,492 | 8/1995 | Kozah et al. | 364/454 |
| 5,451,737 | 9/1995 | Bertholds et al. | 219/69.12 |
| 5,808,263 | 9/1998 | Beltrami | 219/69.12 |

FOREIGN PATENT DOCUMENTS

| | | |
|---|---|---|
| 0 214 295 | 3/1997 | European Pat. Off. . |
| 36 09 709 | 10/1986 | Germany . |
| 42 28 329 | 3/1994 | Germany . |
| 42 28 331 | 3/1994 | Germany . |
| 61-219528 | 9/1986 | Japan . |
| 1-193126 | 8/1989 | Japan . |

OTHER PUBLICATIONS

Patent Abstracts of Japan; vol. 011, No. 057 (M–564); JP 61 219528A.

Search Report of EP corresponding application (EP 97 10 5135).

*Primary Examiner*—Geoffrey S. Evans
*Attorney, Agent, or Firm*—Darby & Darby

[57] ABSTRACT

A method and apparatus for wire electroerosive cutting of a workpiece, the wire guided in a toroidal guide and a main guide associated with the toroidal guide, the position(s) of the toroidal guide and/or of the main guide with respect to the desired position of the erosion wire is(are) calculated in real time, considering the geometry of the contour to be cut and of the instantaneous erosion parameters.

11 Claims, 5 Drawing Sheets

METHOD AND APPARATUS FOR ELECTROEROSIVE CUTTING

BACKGROUND OF THE INVENTION

1. Field of the Invention

The present invention relates to a method and apparatus for electroerosive cutting of a workpiece having a wire electrode, suitable for erosive cutting, guided in at least one toroidal guide and possibly at least one main guide which is associated with the toroidal guide.

2. Description of the Related Art

Such devices which have a toroidal guide are known, for instance, from DE 42 28 331 A1. Toroidal guides are particularly suitable for conical cuts. For this, DE 42 28 331 A1 provides two wire guides, one on the top side and the other on the bottom side of the workpiece, an open wire guide—in the following also referred to as main guide—and a toroidal guide being arranged on each side of the workpiece, the toroidal guide being located between the open wire guide and the workpiece. Upon cylindrical cuts, i.e. upon cutting without conical inclination, but also in the case of cuts with a slight conical inclination, the open guide assures precise guidance of the erosion wire. Upon cuts with a larger conical inclination, the toroidal guide assumes the guidance of the wire. By this closed toroidal guidance the slipping of the erosion wire out of the open wire guide is avoided even in the case of large cone angles.

The inside diameter of the toroid and the arrangement of open wire guide and toroidal guide are so selected in DE 42 28 331 A1 that upon the cylindrical or conical cut the wire is guided up to about two degrees of inclination by the open wire guides, while in the case of a cone angle of more than two degrees, it is guided by the toroid. It is therefore of the greatest importance to control the point of contact between wire and toroid. For this purpose, it is proposed, in accordance with DE 42 28 329 A1, to measure the position of the erosion wire within or on the contour of the toroid. In this case, however, a suitable wire-position sensor is necessary on the upper toroid and the lower toroid.

SUMMARY OF THE INVENTION

The object of the invention is to simplify electro-erosive cutting with toroidal guides.

This object is achieved in a method of this type in the manner that the position(s) of the main guide and/or toroidal guides with respect to the desired position of the erosion wire, with due consideration of the geometry of a contour to be cut and the instantaneous erosion parameters, is (are) calculated in real time. Furthermore, this object is achieved in a device of this type by means for calculating in real time the position(s) of the toroidal guide and/or main guide with respect to the desired position of the erosion wire, with due consideration of the geometry of a contour to be cut and of the instantaneous erosion parameters.

The method of the invention and the apparatus of the invention can, to be sure, get along with the single toroidal guide. However, the invention also refers to erosion machines having several, and particularly two, toroidal guides. In particular, each toroidal guide has a main guide associated with it.

The object of the invention makes it possible to calculate the exact position of the main guides and the desired positions of the erosion wire regardless of whether the wire contacts the toroidal guide(s) or not, with due consideration of the controlling geometrical and physical parameters, and to derive (and realize) the path of the main guides.

The position(s) of the main guide(s) and/or the toroidal guide(s) with reference to the desired contour of the workpiece is/are determined from the desired position of the erosion wire and calculated in real time. An interpolation system of the wire erosion machine in this connection calculates in succession, step by step, in real time (for instance every millisecond) what position the wire guide heads, which also contain the toroidal guides and/or main guides, must assume with respect to the programmed desired path in accordance with the contour desired. This path can be defined as a sequence of pairs of points, in each case one point of a pair of points being referred to the upper side of the workpiece and the other point to the lower side of the workpiece.

For the calculation of the position(s) of the main guide(s) and/or toroidal guide(s) one must, starting from these pairs of points on the surface of the workpiece, take into consideration all effects which influence the direction of the wire in order for the erosion wire to be actually where it should be at the entrance into and exit from the workpiece.

In accordance with the invention, the use of wire position sensors can be dispensed so that, in this way, the construction of an electroerosion machine is simplified, i.e. the electroerosion machine gets along with fewer system components. In this way, it is not only cheaper but also less subject to disturbance.

The position calculation indicated above advantageously takes into account in this connection the direction in space of the erosion wire, the contouring error, the relative cutting speed on the upper and lower sides of the workpiece, the stiffness of the erosion wire, and/or the eccentricity of the toroidal guide with respect to the main guide.

In the case of conical cuts in which the cone angle exceeds a given value, for instance 2°, the erosion wire is guided by the toroidal guides, a given working point on the surface of the toroidal guides resulting in each case. The expression "working point" means in the invention, with an (ideally) infinitely flexible erosion wire, the geometrical center point on the arc—in the following also referred to as contact line—where toroidal guide and erosion wire contact each other. In the case of a wire of finite flexibility or of a certain stiffness, the contact line shrinks in the extreme case to a point of contact, which then coincides with the working point.

If the direction in space of the erosion wire changes, for instance in the case of a cone angle which becomes larger, this working point travels—as seen from above on the toroidal guide—outward on the surface of the toroidal guide. In other words, the distance between working point and center point of the toroidal guide increases. When the cone angle becomes smaller, the working point travels inward in corresponding manner, i.e. the distance between working point and center point of the toroidal guide decreases. This displacement of the working point leads to a shift in position of the erosion wire with respect to the toroidal guide. The shift in position has the result that the position(s) of the toroidal and/or main guide(s) or of the wire guide head must be (would have to be) displaced by the corresponding amount. Therefore the calculation of the position of the toroidal and/or main guides (4) takes into account the direction in space of the erosion wire.

A further displacement in position of the erosion wire with respect to the toroidal guide is brought about by the so-called contouring error. The contouring error is produced by a bulging-out of the erosion wire when the wire is pressed rearward as seen in the direction of cutting as a result of the erosion forces and as a function of the flushing pressure. The contouring error also in each case results in a displacement of the working point on the surface of the toroidal guide. The contouring error is therefore advantageously taken into account in the above-mentioned calculation of the position.

If there is a relative cutting speed on the upper and lower sides of the workpiece, i.e., if the cutting speed vectors (cutting speed comprising amount and direction) differ, for instance upon the passage from a cylindrical cut into a conical cut, a further displacement of the working point takes place on each toroidal guide on the surface thereof. This displacement of the working point also effects a displacement of the position of the erosion wire with regard to the corresponding toroidal guide. Therefore, this relative cutting speed is advantageously taken into account in the above-mentioned calculation of the position.

If the erosion wire were infinitely flexible, then the erosion wire would contact the toroidal guide tangentially at a first point, follow the curvature of the toroidal guide up to a second point and there again leave the toroidal guide tangentially in the direction towards the point of entrance of the erosion wire into the workpiece. Since now, however, the erosion wire has a given thickness, i.e. is not infinitely flexible, the erosion wire contacts the toroidal guide, in particular due to the small radius of bend of the toroidal guide, only at the above-mentioned working point which is located on the toroidal surface in the center between the first point and the second point. The curvature of the erosion wire can be calculated advantageously by means of the "beam theory", known from statics. Since the deflection of the erosion wire in the case of the wires actually used takes place approximately only within a few millimeters around the working point, the wire, upon its entrance into the workpiece, is again located on a perfectly straight line. At the entrance point into the workpiece, a first shift, however, takes place. This shift goes hand in hand with an error in the cone angle. Therefore, the stiffness of the erosion wire is advantageously taken into account in the above-mentioned calculation of the position.

A second shift takes place as a result of the eccentricity of a toroidal guide with respect to the associated main guide which is produced for instance by mechanical tolerances or else by the fact that erosion wires of different thickness are used and the arrangements of toroidal guides and main guides are not displaceable relative to each other. As a result of this second shift, there again takes place a displacement of the working point. This displacement effects a displacement in the position of the erosion wire or of the toroidal guide. The eccentricity of the toroidal guide with respect to the main guide is therefore advantageously taken into account in the above-mentioned calculation of position.

With particular preference therefore it is determined by means of the calculated position(s) of the main guide and/or the toroidal guide whether and/or where the erosion wire contacts the toroidal guide(s). From the knowledge whether or where the erosion wire contacts the toroidal guide(s), it can then be determined where and how the erosion wire either leaves the toroidal guide or the main guide and where the wire enters into the workpiece. The knowledge of such data makes an extremely accurate erosion possible.

The contouring error, particularly as contouring error vector, is determined from the instantaneous erosion parameters forming the basis of the erosion, in particular the flushing pressure, the cutting speed, the erosion forces, the pulse frequency, the erosion current and/or the erosion voltage. With a knowledge of the erosion parameters, which may, for instance, be known from the fact that they are preset or are successively newly determined during the erosion process or else can be measured, the contouring error can be determined without separate wire position sensors having to be used.

The positions of two main guides with respect to the desired position of the erosion wire above and below the workpiece are calculated particularly advantageously independently from each other in order, particularly in the case of conical cuts, to take into account a difference—present in the case of different cutting speeds above and below the workpiece—in the contouring error above and below the workpiece. In this way, deviations of the contouring error above and below the workpiece, which may amount to ±15% of a contouring error, can be taken into account. In this way, the precision of the position calculations can be further increased.

A cone error $\Delta\gamma$ caused by the stiffness of the wire can be determined in particularly preferred manner by the formula $$\Delta\gamma = \frac{\gamma - \gamma_{limit}}{H} \sqrt{\frac{E \cdot I}{P}} \qquad \text{(Equation 1)}$$

if the erosion wire contacts at least one toroidal guide, in which formula $\gamma$ is the cone angle, $\gamma_{limit}$ the limit angle between a toroidal guide and the associated main guide, H the vertical distance between the toroidal guides, E the modulus of elasticity of the erosion wire, I the quadratic area moment of the erosion wire, and P the erosion wire tension. From the cone error $\Delta\gamma_0$ there can be noted the above-mentioned first shift, which can be broken down into x- and y-components.

The values of these components enter into the calculation of the position of the toroidal and/or main guides.

Since it is advantageous to correct the inclination of the wire even in the case of small cone angles, the cone error $\Delta\gamma$ caused by the stiffness of the wire if the erosion wire does not contact a toroidal guide is determined by the formula $$\Delta\gamma = \frac{\gamma}{Q} \sqrt{\frac{E \cdot I}{P}} \qquad \text{(Equation 2)}$$

in which $\gamma$ is the cone angle, Q the vertical distance between the main guides, E the modulus of elasticity of the erosion wire, I the quadratic area moment of the erosion wire, and P the erosion wire tension.

The stiffness of the erosion wire is preferably determined by comparing one or more measured cone angles with one or more set cone angles. Since the stiffness or the modulus of elasticity E of the erosion wire is not always precisely known, a "calibration" of the above formula is very advisable. This calibration is effected by measuring the actual cone angle with respect to the cone angle set by a suitable calibrating device over a given part of or the entire angular range. From these measurement data which can be obtained all at once upon a reference measurement, the modulus of elasticity E can be determined in each case for a given type of wire. This value can, in principle, also be dependent on the bending data of the erosion wire such as, for instance, the radius of bend and/or the angle of the bend. The values obtained for the modulus of elasticity E can then be taken into account upon the calculation of the first cone error $\Delta\gamma$, the values for the modulus of elasticity E being obtained from a suitable memory.

The eccentricity of the toroidal guide with respect to the main guide associated with it is preferably calculated from the state of equilibrium of the components of the tensile forces tangential to the toroidal guide which act on the erosion wire in the longitudinal direction of the wire. The toroidal guide can—as seen from above—be represented in simplified manner as a circle. On the toroidal guide there act tangentially components of the tensile forces tangential to this circle which act on the erosion wire in front of and behind the toroidal guide. The working point will now be established at the place where the tangential components of force are in equilibrium with each other. As a result of this condition, the working point can be calculated with a knowledge of the tensile forces in the erosion wire and the eccentricity. In this way the a new position of the toroidal guide(s) with respect to the desired contour of the workpiece can then be calculated.

The above-mentioned device can advantageously be carried out by a method in accordance with one or more of the embodiments described above. With respect to certain features and advantages of the device, reference is had to what has been stated above concerning the method, which remarks refer in their entirety also to the different embodiments of the apparatus.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
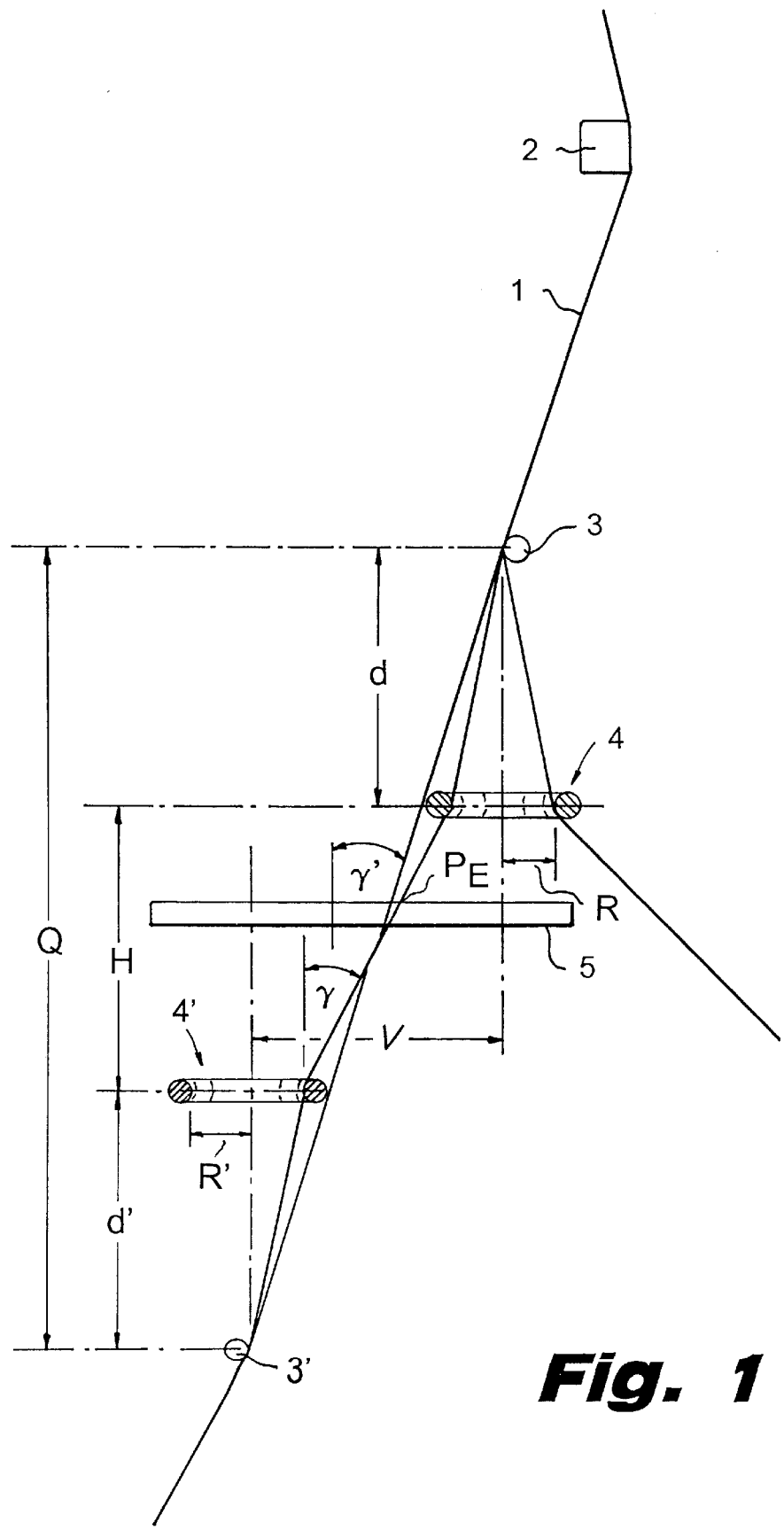
FIG. 1 is a diagrammatic sectional view of a wire erosion arrangement with open wire guides, hereinafter referred to as main guides, and toroidal guides in the case of a conical cut.

In the present specification, indications as to location such as in front of, behind, top, bottom, right and left refer to wire erosion machines in their ordinary operating position and thus are not to be understood in a restrictive sense. Furthermore, numerical indications "x" are to be understood in the sense of "at least x" and only by way of preference in the sense of "precisely x".

Parts having substantially the same function bear the same reference numerals in the figures.

FIG. 1 is limited to a purely diagrammatic showing of essential parts of a wire erosion machine having toroidal guides. An erosion wire 1 is wound from "top" to "bottom" to a wire transport device, not shown. A current feed 2 serves for feeding the electric pulses given off by a generator of the wire erosion machine. In this connection the current feed 2 also imparts a certain initial stress to the erosion wire 1. Below the current feed 3 there is an upper open wire guide 3, also referred as upper main guide. The upper open wire guide 3 is of V-shape, so that, in its position of rest, the erosion wire 1 lies in the "deepest point" of the "V". Below the upper open wire guide 3 there is a closed wire guide, namely an upper toroidal guide 4. The guidance of the erosion wire 1 is therefore effected by the arrangement consisting of open wire guide 3 and toroidal guide 4.

Below the toroidal guide 4 there is the workpiece 5 and below the workpiece 5, in its turn, there is a lower toroidal guide 4' which is shifted by the length V horizontally with respect to the upper toroidal guide 4. Below the lower toroidal guide 4' there is the lower open wire guide 3' at a vertical distance away d'. The upper open wire guide 3 is at a distance d from the upper toroidal guide 4. The inner radius of the upper toroidal guide is R and the inner radius of the lower toroidal guide is R'. The distance between upper open wire guide 3 and lower open wire guide 3' is Q.

In cuts with a cone angle or angle of inclination $\gamma' < \gamma_{limit}$ to the vertical the open wire guide 3 takes over the guidance of the erosion wire 1. The angle $\gamma_{limit}$ amounts for instance to 2°. With such small cone angles $\gamma'$, the erosion wire 1 does not move out of the open wire guide 3 due to its initial tension. With larger cone angles $\gamma$, on the other hand, the toroidal guide 4 takes over the guidance of the wire.

Figure 2:
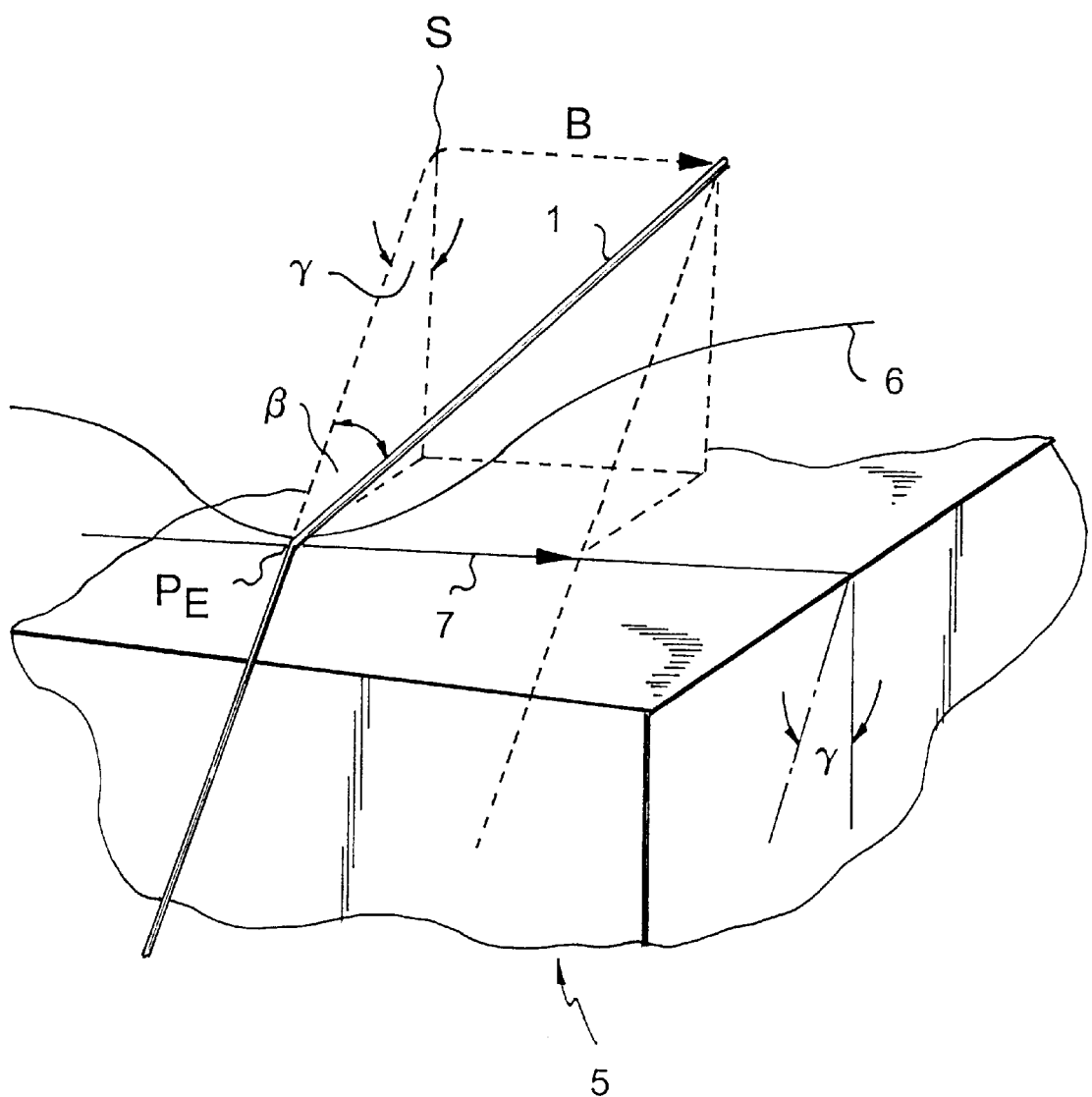
FIG. 2 is a diagram showing the contouring error.

FIG. 2 shows the first effect which must be taken into account upon the correction of the position of a wire guide head. There is concerned here the contouring error B, which is always present in the case of a flexible erosion wire 1 when machining a workpiece 5. The contouring error B is expressed by a bulging of the erosion wire 1 opposite the direction of cutting, the erosion wire 1 being pressed rearward as a result of the erosion forces and the flushing pressure.

FIG. 2 shows the cutting contour 6 of the workpiece 5 which is to be cut. The point $P_E$ characterizes the point where the erosion wire enters the workpiece. In corresponding manner the arrow 7 designates the instantaneous cutting direction of a conical cut with the cone angle $\gamma$. The contouring error B can be characterized also by the contouring angle β. The contouring angle β is the angle between the straight line which is described by the erosion wire 1 in the workpiece and the straight line which is described by the erosion wire 1 outside the workpiece.

In order for the erosion wire to follow the desired contour on the top and bottom sides of the workpiece 5, the contouring error B as correction value for the desired position S must be vectorially added to the direction of the cut 7 in order to take the contouring angle β into account. The contouring error d or contouring angle β can be calculated from the instantaneous erosion parameters and from the previously known geometry of the contour to be cut. The amount and direction of the contouring error vector are calculated separately. The calculation of the amount of the vector is preferably effected from the instantaneous working current and the instantaneous working voltage and from the instantaneous pressure of the flushing flowing around the cutting wire, while the direction of the vector is calculated from the angle which is present between the direction of the contouring error at the end of a path element of the contour curve and the direction of the next path element of the contour curve to be cut. The calculation formulas to be employed here contain, in addition to said values, only those parameters which depend on fixed parameter of the machine and known parameters of the workpiece and are determined in advance experimentally or arithmetically from these parameters and can be introduced in the preparation for the machining of the workpiece, for instance in the software for the computerized arithmetical control (CNC) of the wire erosion machine.

After the correct inclination of the erosion wire has been determined, it must be established whether or not the erosion wire 1 contacts the toroidal guide 3 or 3'. In the event of contact by the erosion wire 1, a correction value $K_{toro}$ must be found which must be added to the control positions of the wire guides calculated up to now. For the calculation of the correction value $K_{toro}$ there must be taken into consideration—aside from the geometrical parameters of the toroidal guide 4—the radius of curvature of the wire at the toroidal guide 4, as well as its eccentricity with respect to the corresponding main guide 3.

Figure 3:
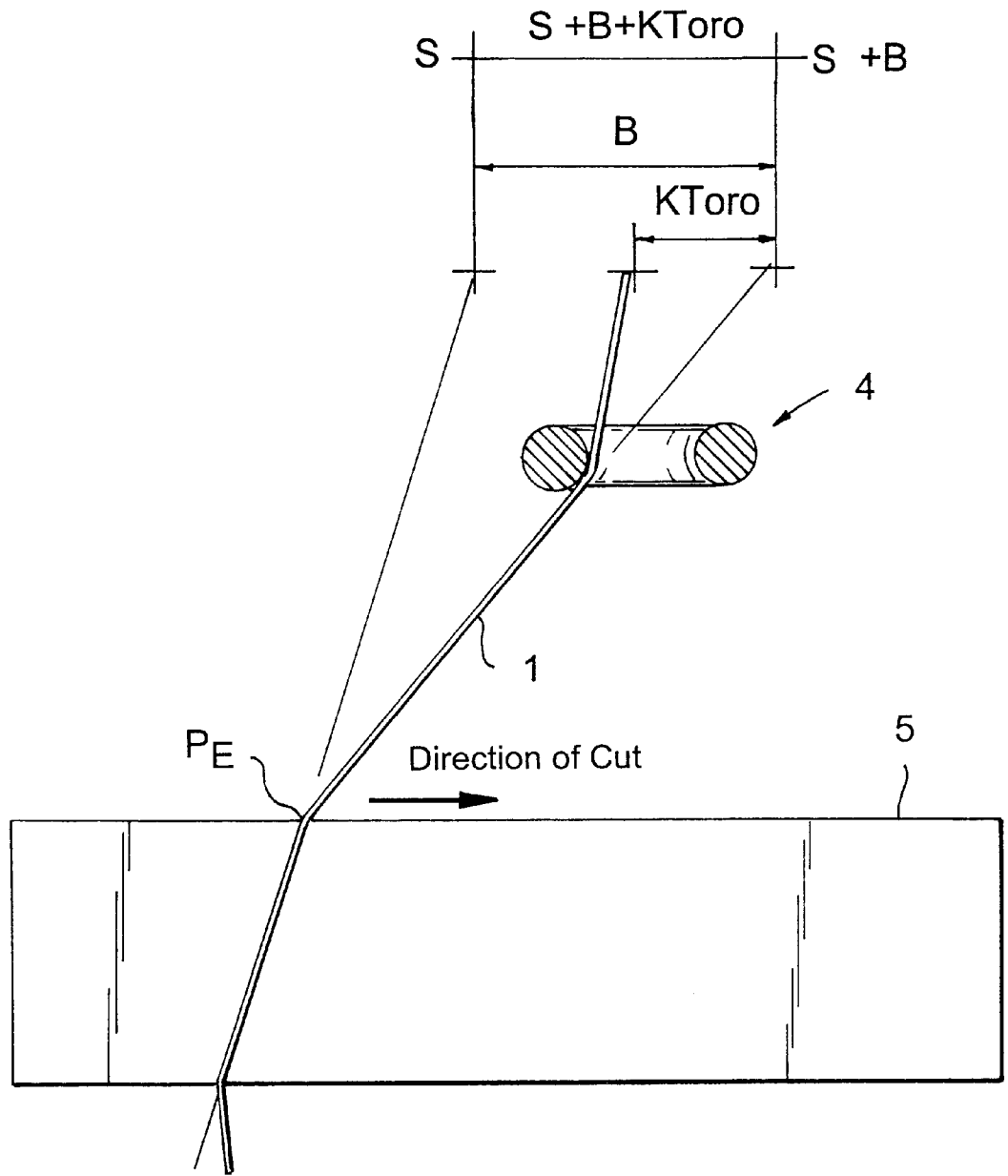
FIG. 3 is a diagram showing a position correction of a wire guide head.

In accordance with FIG. 3, the desired position is referred to the main guide 3 (not sown). Accordingly, the desired position S of the main guide 3 results from the contouring error B as well as from the correction value $K_{toro}$.

Figure 4:
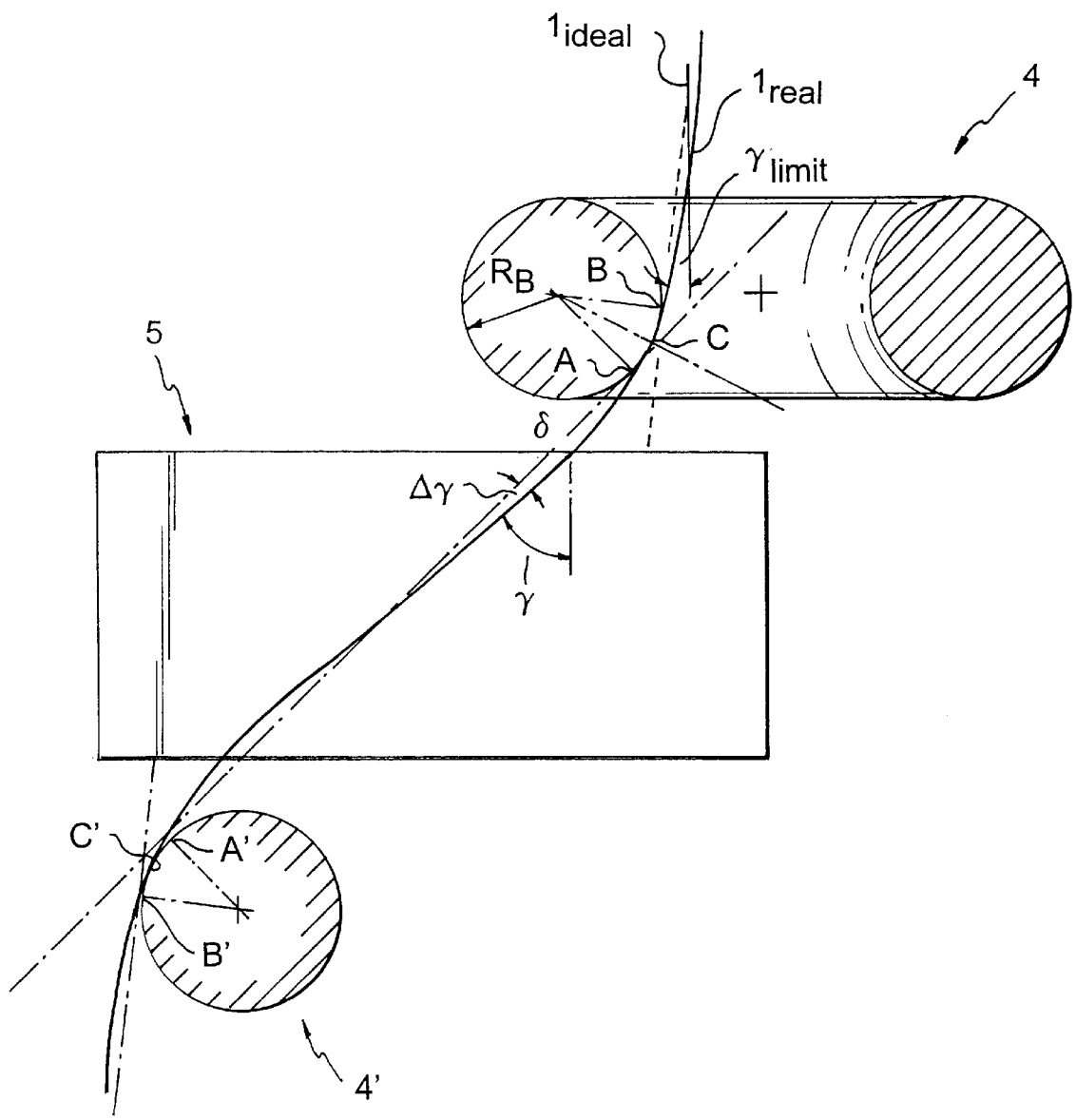
FIG. 4 is a diagram showing the enlargement of the cone angle caused by the stiffness of the wire.

FIG. 4, to be sure, is shown only the upper toroidal guide 4 and the corresponding correction values, but it is self-evident that the lower toroidal guide 4' with corresponding correction values could be shown arranged in corresponding manner on the lower side of the workpiece 5.

The effect of this first shift which has been described above can be noted from FIG. 4: for reasons of symmetry, the actual inclination is greater by the angle $\Delta\gamma$, which can be calculated by means of the above-indicated formula (Equation 1).

Also in the case of smaller cone angles the inclination of the wire must be corrected, using the similar above-indicated formula (Equation 2).

FIG. 4 is a diagrammatic lateral section through the toroidal guides 4, 4' and the workpiece 5. An ideal erosion wire $1_{ideal}$ which is shown here additionally indicated as a phantom line—i.e. with dotted cross section—would, as shown in FIG. 3, extend along the dashed line. Actually, the erosion wire $1_{real}$, however, has a certain stiffness. This real course is shown in FIG. 4 by the solid line. The stiffness has the result that the erosion wire $1_{real}$ in particular due to the small angle of bend $R_B$ of the toroidal guide 4, contacts the toroidal guide only at one point C. This point (also referred as working point) is located precisely in the center of the arc which connects the points A and B. The radius of this arc is equal to the radius of bend of the toroidal guide. The real erosion wire $1_{real}$ thus is imparted, as compared with the ideal erosion wire $1_{ideal}$, a new curvature which can be calculated with the aid of the so-called "beam theory". In all erosion wires actually used, the deflection of the wire takes place within a few millimeters around the point of contact C, so that the erosion wire $i_{real}$, upon entrance into the workpiece 5, is again on a perfectly straight line, namely the dashed line shown for the ideal erosion wire $1_{ideal}$. The erosion wire $1_{real}$, however experiences a first shift δ with respect to the ideal line, which is described by the straight line which connects the points A and A'. This first shift δ produces an error of the cone angle, referred to as cone error $\Delta\gamma$. The straight line through the points A and A' is perpendicular to the radii of bend $R_B$ at the points A and A'.

Although FIG. 4 shows the detailed geometrical arrangement for the upper toroidal guide 4, the above remarks also apply to the lower toroidal guide 4'.

Figure 5:
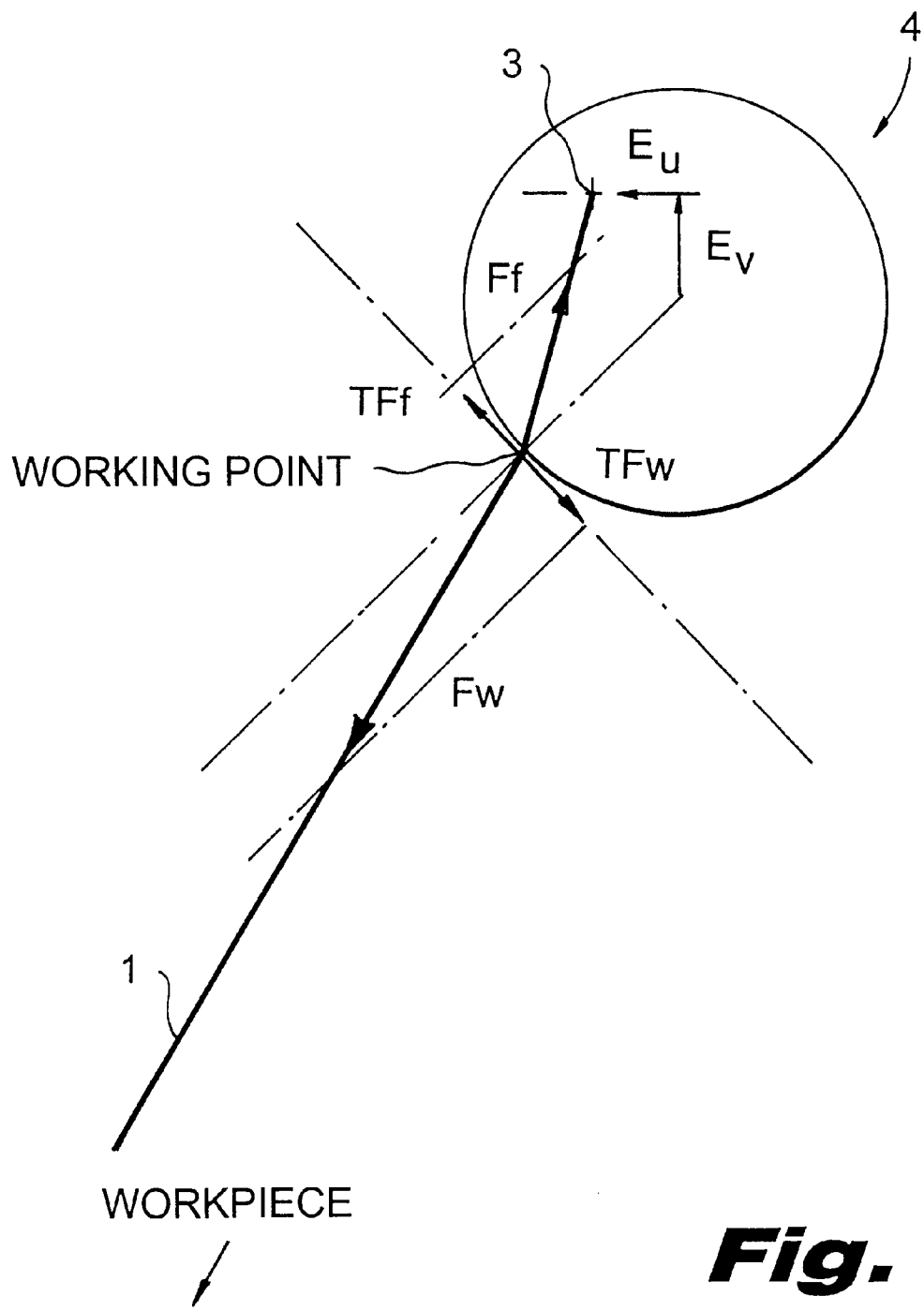
FIG. 5 is a diagram showing the second shift due to the eccentricity of the toroidal guide with respect to the main guide.

Finally there must also be taken into account a further effect which results due to the eccentricity $E_0$, $E_1$ of the toroidal guides 4 with respect to the associated main guides 3. FIG. 5 shows diagrammatically—seen from above—the toroidal guide 4, shown in idealized fashion as a circle, the upper main guide 3, shown in idealized fashion as a cross, the erosion wire 1 as well as the forces $F_w$, $F_f$, $TF_w$, $TF_f$ acting on the erosion wire. The force $F_w$ characterizes the force which pulls the erosion wire 1 in the direction of the workpiece 5. The force $F_f$ characterizes the force which pulls the erosion wire 1 in the direction of the upper main guide 3. $TF_w$ characterizes the force which can be formed by the resolving of the force $F_w$ and acts tangentially to the circle of the toroidal guide 4. In corresponding manner, $TF_f$ characterizes the force which, upon the resolving of the forces of the force $F_f$, acts tangentially to the circle of the toroidal guide 4.

FIG. 5 shows that the working point of the erosion wire 1 is located at the place where the tangential components of force $TF_f$ and $TF_w$ are in equilibrium with each other. With a knowledge of the eccentricity $E_x$, $E_y$, and of the force $F_f$ and $F_w$ acting in the wire, the location of the working point which is established can thus be determined analytically.

Although FIG. 5 shows diagrammatically only the upper toroidal guide 4 and upper main guide 3, the above remarks apply in similar manner also to the lower toroidal guide 4' and lower main guide 3'.

The effects described above can be recalculated, one after the other, in real time up to the final determination of the positions of the main guides and/or toroidal guides. However the logical sequence with which the displacements are calculated is important: Due to the non-linearity of certain effects, the calculation of each displacement must take into account the displacements caused by the earlier effects.

For reasons of clarity, not all figures take all effects into account in all cases. It should, however, be pointed out that this description of the figures, which is directed at individual effects, does not constitute any limitation on the invention.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for electroerosive machining with a wire electrode, comprising the steps of:
   guiding the wire in at least one toroidal guide;
   guiding the wire in at least one main guide associated with the toroidal guide;
   calculating the position of the toroidal guide in real time with respect to the desired position of the erosion wire under consideration of the geometry of the contour to be cut and of the actual erosion parameters.

2. The method according to claim 1, further comprising the step of considering for the calculating step at least one of the spacial direction of the erosion wire, the contouring error, the relative cutting speed at the upper and lower sides of the workpiece, the stiffness of the erosion wire and the eccentricity of the toroidal guide.

3. The method according to claim 1, further comprising the step of determining, by means of a plurality of calculated positions of the main guide, whether the erosion wire contacts the toroidal guide and upon contacting, where the erosion wire contacts the toroidal guide.

4. The method according to claim 1, further comprising the step of determining the contouring error (B) as contouring error vector from at least one of flushing pressure, cutting speed, erosion forces, pulse frequency, erosion current and erosion voltage.

5. The method according to claim 4, further comprising the step of determining a cone error $\Delta\gamma$ caused by the stiffness of the wire is determined by the formula:

$$\Delta\gamma = \frac{\gamma - \gamma_{limit}}{H}\sqrt{\frac{E \cdot I}{P}}$$

if the erosion wire contacts at least one toroidal guide, in which formula:

$\gamma$ is the cone angle;

$\gamma_{limit}$ is the limit angle between a toroidal guide (4; 4') and the associated main guide;

H is the vertical distance between the toroidal guide;

E is the modulus of elasticity of the erosion wire;

I is the quadratic area moment of the erosion wire; and

P is the erosion wire tension.

6. The method according to claim 1, wherein the at least one main guide is two main guides, and further comprising the step of calculating the positions of the two main guides with respect to the desired position of the erosion wire above and below the workpiece independently of each other for considering a difference, occurring upon different cutting speeds above and below the workpiece, in the contouring error (B) above and below the workpiece.

7. A method according to claim 6, further comprising the step of calculating the eccentricity of the toroidal guide with respect to the main guide by determining the state of equilibrium of the components tangential to the toroidal guide of the tensile forces ($TF_w$, $TF_f$) acting on the erosion wire in the longitudinal direction of the wire.

8. The method according to claim 6, further comprising the step of determining a cone error $\Delta\gamma$ caused by the stiffness of the wire is determined by the formula:

$$\Delta\gamma = \frac{\gamma}{Q}\sqrt{\frac{E \cdot I}{P}}$$

if the erosion wire does not contact a toroidal guide, in which:

$\gamma$ is the cone angle;

Q is the vertical distance between the main guides;

E is the modulus of elasticity of the erosion wire;

I is the quadratic area moment of the erosion wire; and

P is the erosion wire tension.

9. The method according claim 6, further comprising the step of determining the stiffness of the erosion wire by comparing at least one cone angle set to at least one adjusted cone angle.

10. An apparatus for the electroerosive cutting of a workpiece having an erosion wire, guided in at least one toroidal guide, comprising:

means for calculating in real time a plurality of positions of the toroidal guide with respect to the desired position of the erosion wire, under consideration of the geometry of a contour to be cut and of actual erosion parameters.

11. An apparatus according to claim 10, further comprising at least one main wire guide associated with the toroidal guide, and wherein the means for calculating in real time includes a calculation of the main guide with respect to the desired position of the erosion wire, under consideration of the geometry of a contour to be cut and of actual erosion parameters.

* * * * *